Aug. 12, 1969 S. S. FRY 3,461,355
TANTALUM COMPONENT FOR ELECTRICAL DEVICES AND METHOD OF MAKING
Filed April 25, 1967
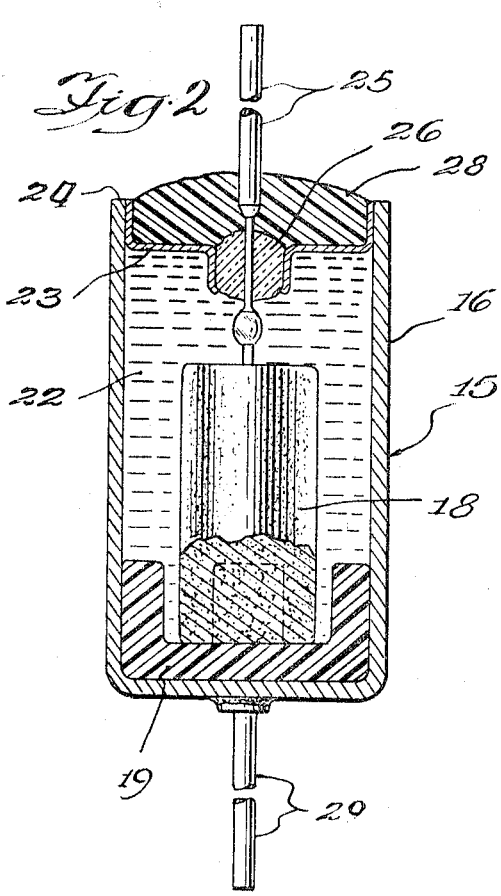
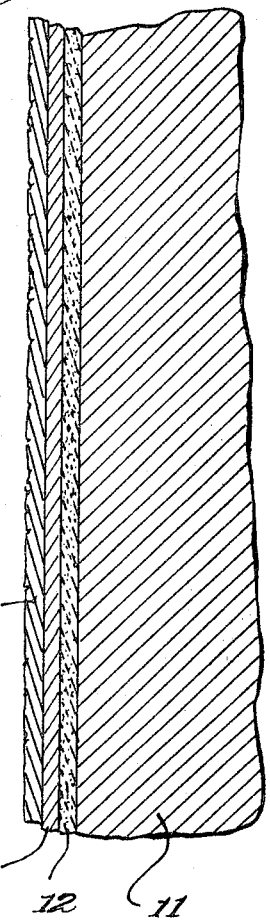
INVENTOR
Stanley S. Fry
BY Dressler, Goldsmith, Clement & Gordon
ATTORNEYS United States Patent Office 3,461,355
Patented Aug. 12, 1969

3,461,355
TANTALUM COMPONENT FOR ELECTRICAL
DEVICES AND METHOD OF MAKING
Stanley S. Fry, North Chicago, Ill., assignor to Fansteel
Inc., a corporation of New York
Filed Apr. 25, 1967, Ser. No. 633,444
Int. Cl. H01g 9/05
U.S. Cl. 317—230                                23 Claims

ABSTRACT OF THE DISCLOSURE

A tantalum casing for an electrical device, having a first gold coating in contact therewith and diffused through any nonconductive film on the inner surface of the tantalum to provide a conductive path through any said film, a second layer of gold plated over the first gold coating, and a layer of platinum black plated over the second layer of gold. The casing can be prepared by plating a layer of gold on the inner surface of the tantalum casing, heating the gold-plated tantalum casing in an environment free of reactive gases to diffuse the gold onto any nonconductive film on the surface of the tantalum, plating a second layer of gold onto the interior of the tantalum casing, and finally plating a layer of platinum black onto the second layer of gold.

Background of the invention

It is well known that many advantages are derived from using tantalum components for electrical devices such as electrolytic devices. One drawback, however, in the use of tantalum electrical components is that when tantalum is exposed to the air, its surface quickly acquires a thin dielectric film of tantalum oxide which is difficult to remove and, once removed, is difficult to prevent from reforming. This dielectric film generally has sufficient electrical resistance so that little electric current will flow across it unless the potential is at least about 3 volts or greater.

Such dielectric films detract from the use of tantalum in electrical devices as non film-forming, conductive electrodes such as cathodes in electrolytic capacitors. For example, the dielectric film on a tantalum casing used in an electrolytic capacitor reduces the effective capacitance and increases the effective series resistance of the device.

It is often further desirable for non film-forming electrodes, such as cathodes for electrolytic capacitors, to have as high a surface area as possible, in order to provide, for example, a maximum amount of charge-storage capacity. The amount of surface area on an electrode is frequently increased by plating it with platinum black, a spongy, porous form of platinum. Palladium black can also be used for this purpose. Such a technique is, for example, desirable in the preparation of casings for electrolytic capacitors, as the high surface area of the platinum black improves the capacitance of the device. Unfortunately, previous attempts to plate platinum to tantalum casings have been unsuccessful, due in part to poor adhesion on the part of the platinum.

Summary of the invention

In accordance with this invention, there is provided a non film-forming tantalum electrode for use in electrical devices, such as electrolytic capacitors, having a large surface area and excellent electrical characteristics.

Such a tantalum electrode, e.g., a tantalum casing, is gold plated on its inner surface to provide a conductive path to the tantalum metal through any dielectric film on the tantalum surface. Such a conductive path, which effectively "shorts out" the film, increases the conductivity, by a factor of 10 or more, of the inner surface of the casing rendering it more suitable for use in electrical devices. Furthermore, the layer of gold on the inner surface of the casing is receptive to platinum or palladium plating, including platinum or palladium black.

The above advantages are attained by plating a layer of gold on the surface of the tantalum, which surface my have a dielectric film formed thereon. The plated tantalum is then heated either in a vacuum or under an inert gas such as argon or helium, causing the plated gold to diffuse into the dielectric film. This provides conductive paths of gold which pass through and "short out" the film. The above heating typically takes place at a temperature slightly below the melting point of gold, often in a temperature range of about 600° to 1030° C.

At a heating temperature of about 1000° C., the desirable diffusion of the gold is generally complete in five minutes or less. At lower heating temperatures, longer periods are required in order for the desirable amount of diffusion to occur.

Following diffusion of the gold, the tantalum is cooled, and its interior surface is once again plated with gold. After this step, the interior surface will be receptive to plating with platinum or palladium, if desired.

Numerous other advantages and features of the present invention will become readily apparent from the following detailed description of the invention and one embodiment thereof, from the claims, and from the accompanying drawings in which each and every detail shown is fully and completely disclosed as part of this specification, and in which like reference numerals refer to like parts.

The drawing

FIGURE 1 illustrates a diagrammatic view of the wall of a piece of tantalum treated in accordance with this invention, and;

FIGURE 2 illustrates a cross-sectional view of an electrolytic capacitor which utilizes the tantalum casing incorporating this invention.

Referring to FIGURE 1, there is shown tantalum 11, usually coated with an oxide film 12 wherever the tantalum has contacted the air. Gold is diffused in dielectric film 12, providing conductive paths through the film, and film 12 is coated with a plated gold layer 13 which in turn carries a plated layer of platinum black 14. The conductivity between the layer of platinum black 14 and tantalum 11 is very high compared with the conductivity through a similar electric film on tantalum which contains no diffused gold.

Referring to FIGURE 2, there is an electrolytic capacitor 15 incorporating a tantalum casing 16, shaped in the form of a cylindrical cup. An anode 18 is disposed within casing 16, being typically a pellet of porous tantalum metal which is coated with a thin dielectric film by anodization. The anode 18 is supported by an insulating spacer 19 located between anode 18 and the bottom of casing 16. The remaining volume of casing 16 is generally filled with an electrolyte 22, for example, sulfuric acid. The open end of the casing is closed by an annular metallic disk 23 which is welded about its circumference to the lip 24 of casing 16 to provide a seal. Disk 23 is typically made of tantalum.

A lead 25, also typically made of tantalum, extends out of anode 18 to the exterior of casing 16 through seal 26, which is located in the annulus of disk 23. Seal 26 is typically made of glass.

The space above disk 23 and seal 26 may be filled with an encapsulating resin 28 to protect seal 26 and to support lead 25.

A second lead 29 is welded to the bottom of casing 16, and is generally made of nickel.

Specific embodiment

A ¾-inch by ⅜-inch tantalum cylindrical casing which is closed at one end is generally grit-blasted to roughen its interior surface. The casing is then filled with a conventional gold-plating solution. One typical plating solution can be made from one liter of deionized water, two grams of potassium aurous cyanide

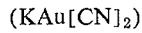

75 grams of ammonium chloride, 15 grams of sodium citrate, and 10 grams of sodium hypophosphite. Another suitable plating bath is sold under the trade name Aurall by Lea-Ronal Incorporated. A platinum anode is then inserted into the plating bath in the casing, and current is allowed to run for about five minutes, typically at a density of 20 milliamps per square inch of surface area in the interior or the casing (about 35 milliamps). The electrical potential required for this generally stays below five volts.

The casing is then washed, dried, and inserted into a chamber which is then evacuated. The evacuated chamber is heated at about 1000° C., and the heating is maintained for four minutes after the interior of the chamber reaches 1000° C.

Typically, the gold film which is plainly visible before heating disappears by the end of the heating step, as the gold diffuses into the dielectric film of the casing.

Following this, the chamber is cooled, and the casing removed. The casing is filled with another gold-plating solution which may be of the same composition as used previously, the platinum anode is inserted, and a second plating is performed, generally at the same current density as before, for a period of about 10 minutes. After five minutes of plating, about two thirds of the plating solution can be replaced with new solution in order to provide more gold for further plating.

Following this, the casing is washed in deionized water and dried. It is then filled with a conventional platinum plating solution. One typical solution consists of 870 cc. of deionized water, 30 cc. of one weight percent water solution of lead acetate, and 100 cc. of a ten weight percent solution of chloroplatinic acid. A platinum anode is inserted into the filled casing, and current is run typically at about 150 milliamps for a period of about three minutes to produce a uniform film of platinum black inside of the casing. The potential required generally stays below five volts.

The tantalum casing which is produced by the process of this invention can be used with superior results in devices such as electrolytic capacitors, acting as a non film-forming electrode of low resistance and high surface area. Surfaces of other tantalum objects besides casings can also be prepared in accordance with this invention to provide tantalum components of high surface area and surface conductivity.

It will be readily observed from the foregoing detailed description of the invention and the illustrated embodiments thereof that numerous variations and modifications may be effected without departing from the true spirit and scope of the novel concepts and principles of this invention.

What is claimed:

1. An electrode comprising a tantalum surface, a high-resistance film on said tantalum surface, a layer of gold on said film having a portion thereof passing through said film to define a conductive connection between said gold layer and said tantalum surface.

2. The electrode of claim 1 having a layer composed of material selected from the group consisting of platinum black and palladium black plated over said gold layer.

3. The tantalum electrode of claim 1 having a layer of platinum plated over said gold layer.

4. A non film-forming electrode for an electrolytic device comprising a tantalum surface, a high-resistance film adhering to said tantalum surface, a layer of gold disposed on said film, a portion of said gold layer being diffused through said film to electrically connect said gold layer and said tantalum surface through said film, and a layer selected from the group consisting of platinum and palladium disposed on said gold layer.

5. The electrode of claim 4 in which the second layer is platinum black.

6. A non film-forming casing for an electrical device comprising a tantalum inner surface carrying a dielectric film thereon, said film having diffused gold dispersed therethrough, a layer of gold disposed on said film, said diffused gold electrically interconnecting said layer of gold and said tantalum inner surface through said film.

7. The casing of claim 6 having a layer selected from the group consisting of platinum and palladium disposed on said layer of gold.

8. The casing of claim 6 in which said layer disposed on said layer of gold is platinum black.

9. The casing of claim 6 including a second layer of gold disposed on said film.

10. An electrolytic device comprising, in combination, a first electrode having a dielectric film thereon, a second non film-forming electrode, and an electrolyte forming an electrical connection between said electrodes, said non film-forming electrode comprised of a tantalum surface, a high-resistance film adhering to said surface, a layer of gold dispersed on said film, gold dispersed through said film to conductively interconnect said tantalum surface and gold layer, and a layer selected from the group consisting of platinum and palladium disposed on said gold layer.

11. The electrolytic device of claim 10 in which the non film-forming electrode serves as a casing for the device.

12. The device of claim 11 in which a lead extending from said first electrode, passes out of and is insulated from said casing.

13. The device of claim 10 in which the gold layer is covered with a coating of platinum black.

14. An electrolytic device comprising, in combination, a casing having an inner tantalum surface carrying a dielectric film thereon, a layer of gold on said film, said film including diffused gold dispersed therethrough to electrically interconnect said gold layer and said tantalum surface, a layer of platinum black disposed on said gold layer, said casing having disposed therein an anode having a dielectric film on its surface, said anode having a lead extending therefrom out of said casing and insulated therefrom, an electrolyte filling the remaining volume of said casing, and means for sealing said casing to prevent leakage of the electrolyte therefrom.

15. The process of preparing a non film-forming electrode having a tantalum surface and a high-resistance film adhering thereto comprising the steps of depositing a layer of gold on the surface of said film, heating the electrode in an environment free of reactive gases for diffusing at least a portion of said gold layer through said high-resistance film to provide a conductive path therethrough, whereby an electrical connection is established through said film between the gold layer on the surface thereof and said tantalum surface.

16. The process of claim 15 in which the gold is diffused at a temperature of from 600° to 1030° C.

17. The process of claim 15 in which said gold layers are deposited by plating at a current density of about 20 milliamps per square inch of area to be plated.

18. The process of claim 15 with the additional step of depositing a second layer of gold on said gold diffused film.

19. The process of claim 18 with the additional step of depositing a layer of platinum black on said second layer of gold.

20. The process of claim 15 with the additional step of depositing a layer of metal selected from the group consisting of platinum and palladium on said layer of gold.

21. The process of claim 20 in which said metal is platinum in the form of platinum black.

22. The process of making a tantalum casing suitable for use in an eletrolytic device comprising the steps of plating a gold layer on a dielectric film carried by the inner surface of said tantalum casing, heating said plated tantalum casing to diffuse said gold layer into said dielectric film, plating a second layer of gold on said dielectric film, whereby said diffused gold in said film defines an electrical connection between said second layer of gold and said tantalum casing, and plating a layer of platinum black on said second layer of gold.

23. The process of making a tantalum casing suitable for use in an electrolytic device comprising the steps of electrolytically plating a gold layer on a dielectric film carried by the inner surface of said tantalum casing at a current density of about 20 milliamps per square inch of area to be plated, heating said plated tantalum casing at a temperature of from 600° to 1030° C. to diffuse said gold layer into said dielectric film, electrolytically plating, at a current density of about 20 milliamps per square inch of area to be plated, a second layer of gold on said gold diffused dielectric film, whereby said diffused gold in said dielectric film, defines an electrical interconnection between, said second layer of gold and the surface of said tantalum casing through the dielectric film, and electrolytically plating a layer of platinum black on said second layer of gold.

References Cited

UNITED STATES PATENTS

| | | | |
|---|---|---|---|
| 2,907,933 | 10/1959 | Nazzewski | 317—230 |
| 2,923,866 | 2/1960 | Wagner | 317—230 |
| 3,082,360 | 3/1963 | Robinson et al. | 317—230 |
| 3,237,060 | 2/1966 | Ross | 317—230 |

FOREIGN PATENTS

| | | |
|---|---|---|
| 811,331 | 4/1959 | Great Britain. |

JAMES D. KALLAM, Primary Examiner

U.S. Cl. X.R.

29—570

PO-1050
(5/69)

UNITED STATES PATENT OFFICE
CERTIFICATE OF CORRECTION

Patent No. 3,461,355  Dated August 12, 1969

Inventor(s) Stanley S. Fry

It is certified that error appears in the above-identified patent and that said Letters Patent are hereby corrected as shown below:

Column 2, line 32, "lilke" should be --like--; line 50, "electric" should be --dielectric--; line 56, after "film" insert --formed--. Column 3, line 44, after "of" insert --a--; line 70, "betwen" should be --between--; line 73, after "of" insert --a--. Column 4, line 11 "the" should be --said--; line 32, "dispersed" should be --disposed--; line 34, after "and" insert --said--.

SIGNED AND
SEALED
APR 28 1970

(SEAL)
Attest:

Edward M. Fletcher, Jr.
Attesting Officer

WILLIAM E. SCHUYLER, JR.
Commissioner of Patents